(12) United States Patent
Lehmann et al.

(10) Patent No.: US 7,513,107 B2
(45) Date of Patent: Apr. 7, 2009

(54) AIR SUPPLY DEVICE FOR AN INTERNAL COMBUSTION ENGINE

(75) Inventors: Hans-Georg Lehmann, Esslingen (DE); Martin Schlegl, Rudersberg (DE); Holger Stark, Tettnang (DE)

(73) Assignee: Daimler AG., Stuttgart (DE)

( * ) Notice: Subject to any disclaimer, the term of this patent is extended or adjusted under 35 U.S.C. 154(b) by 16 days.

(21) Appl. No.: 11/344,968

(22) Filed: Jan. 31, 2006

(65) Prior Publication Data
US 2006/0150928 A1 Jul. 13, 2006

Related U.S. Application Data

(63) Continuation-in-part of application No. PCT/EP2004/008325, filed on Jul. 24, 2004.

(30) Foreign Application Priority Data
Aug. 1, 2003 (DE) ................. 103 35 261

(51) Int. Cl.
*F01N 3/00* (2006.01)
(52) U.S. Cl. .................... 60/289; 60/280
(58) Field of Classification Search .......... 60/280, 60/289, 290, 293, 605.1, 605.2; 415/121.2; 123/565
See application file for complete search history.

(56) References Cited

U.S. PATENT DOCUMENTS 3,303,994 A 2/1967 Morooka
4,147,467 A * 4/1979 Leicht et al. ................. 415/196
4,254,617 A * 3/1981 Papsdorf .................. 60/39.465
5,186,601 A * 2/1993 Treece et al. ............... 415/58.4
5,720,595 A * 2/1998 Avny .......................... 416/180
6,094,909 A * 8/2000 Weber et al. .................. 60/280
6,425,743 B1 7/2002 Fischer
6,817,173 B2 * 11/2004 Paffrath et al. ................ 60/293
6,883,323 B2 * 4/2005 Hummel ...................... 60/606
7,083,379 B2 * 8/2006 Nikpour et al. ............ 415/56.5
2003/0172913 A1 * 9/2003 Hummel et al. .......... 123/559.1

FOREIGN PATENT DOCUMENTS

| DE | 196 15 237 C2 | 10/1997 |
| DE | 196 41 467 A | 4/1998 |
| DE | 199 37 781 A | 2/2001 |
| DE | 199 37 781 A1 | 2/2001 |
| GB | 466203 | 6/1936 |
| WO | WO 02/27164 A1 | 4/2002 |

* cited by examiner

*Primary Examiner*—Thomas E Denion
*Assistant Examiner*—Diem Tran
(74) *Attorney, Agent, or Firm*—Klaus J. Bach

(57) ABSTRACT

In a secondary air supply device comprising a turbine and a compressor with turbine and compressor wheels having blades which are covered by wheel covers and an air filter structure disposed between the turbine and compressor wheels, so that air is supplied to the compressor and to the turbine from a common filter structure disposed between the compressor and the turbine wheels.

11 Claims, 8 Drawing Sheets

AIR SUPPLY DEVICE FOR AN INTERNAL COMBUSTION ENGINE

This is a Continuation-In-Part Application of International Application PCT/EP2004/008325 filed 24 Jul. 2004 and claiming the priority of German Application 103 35 261.9 filed 1 Aug. 2003.

BACKGROUND OF THE INVENTION

The invention relates to a secondary air supply device including a compressor and a turbine wheel for an internal combustion engine.

A secondary air supply device with a compressor wheel and a turbine wheel for an internal combustion engine is already known (DE 199 37 781 A1) wherein the compressor and turbine wheels however are configured in an uncovered, conventional design. The wheels are disposed in a housing with a radial gap between the wheel blades and the housing, which radial gap results in undesirable losses.

It is the object of the present invention to provide a more efficient secondary air supply device.

SUMMARY OF THE INVENTION

In a secondary air supply device comprising a turbine and a compressor with turbine and compressor wheels having blades which are covered by wheel covers and an air filter structure disposed between the turbine and compressor wheels, so that air is supplied to the compressor and to the turbine from a common filter structure disposed between the compressor and the turbine wheels.

The compressor wheel and the turbine wheel according to the invention provide for a simple inexpensive sealing arrangement with respect to the housing. There is no longer a radial gap between the blades and the housing and, accordingly, gap losses along the blade structures do not occur. Furthermore, it is advantageous that there are scarcely any critical tolerances to be maintained during the manufacture of the wheels.

Advantageous embodiments of the compressor wheel and the turbine wheel are provided in particular by an optimum air inflow to the compressor wheel in combination with an air filter element and an air inlet channel. Moreover, the manufacture of the secondary air charger is substantially facilitated because of the absence of the gap problem, as the typical effects of the relatively large tolerances in wheels manufactured from plastics are kept small.

The invention will become more readily apparent from the following description thereof on the basis of the accompanying drawings:

DESCRIPTION OF THE EXEMPLARY EMBODIMENTS

Figure 1:
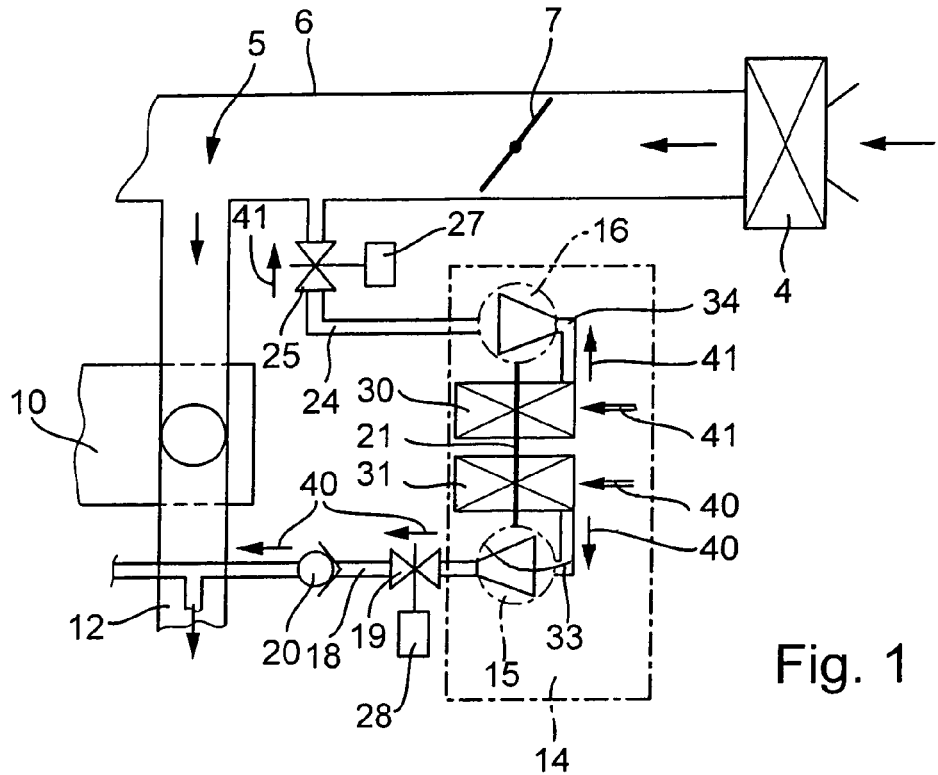
FIG. 1 shows in a simplified functional illustration a secondary air supply device according to a first embodiment of the invention.

FIG. 1 shows in a diagrammatically simplified functional illustration a secondary air supply device for an internal combustion engine 10. Air is supplied to the internal combustion engine 10 via an air filter 4, said air passing further into an intake section 5 which comprises an intake manifold 6 and a throttle valve 7. The air which flows from the air filter passes to cylinders (not shown) of the internal combustion engine 10 in a manner which is controlled by the throttle valve 7. The exhaust gases which are emitted by the internal combustion engine 10 pass in a known manner into an exhaust gas region 12 comprising the exhaust manifold and the exhaust gas treatment system. The secondary air supply device has a secondary air charger 14 which is delimited by dash-dotted lines in FIG. 1 and has a compressor 15 and a turbine 16. The compressor 15 supplies air into the exhaust gas region 12 of the internal combustion engine 10 via a secondary air line 18. In the secondary air line 18 which opens into the exhaust gas duct 12, for example, downstream of the exhaust manifold. A first control valve 19, for example, is provided in the secondary air line 18 downstream of the compressor 15 and a non-return valve 20, for example, is provided even further downstream.

The compressor 15 is connected to the turbine 16 via a shaft 21 and is driven by the turbine 16. The turbine 16 uses the pressure difference brought about by the throttle valve 7 in the intake section 5 with respect to atmosphere by restricting the intake air flow through the air intake duct 6 and generating a vacuum downstream of the throttle valve 7. The feed line 24 which is connected to the intake duct 6 downstream of the throttle valve 7 extends to the turbine 16. A second control valve 25 is provided in the feed line 24 in order to control the power output of the turbine 16 which results from the mass flow in the feed line 24 and the prevailing underpressure in the intake manifold 6. Both control valves 19, 25 can be actuated via corresponding actuators 27, 28. There is then provision, in order to supply clean air for the compressor 15 and for the turbine 16, as FIG. 1 shows, for in each case a separate air filter element 30 for the turbine 16 and a separate air filter element 31 for the compressor 15. The two air filter elements 30, 31 are provided in addition to the air filter 4, which makes it possible to dispense with corresponding air feed lines to the air filter 4 or the intake manifold 6. As the arrows 40 show, the air which is sucked in by the compressor 15 flows via the air filter element 31 and a line section 33 to the compressor 15, where the air is compressed or pumped correspondingly into the secondary air line 18. The amount of secondary air is controlled by the second control valve 25, the nonreturn valve 20 which is provided preventing a return flow of exhaust gas from the exhaust duct 12 of the internal combustion engine 10.

The turbine 16 makes it possible, in particular in the starting phase of the internal combustion engine 10, to introduce additional air to the exhaust gas side, as a result of which the hydrocarbons and carbon monoxides are oxidized, which leads to an improvement in the exhaust gas quality of the internal combustion engine 10.

As the arrows 41 show, when the second control valve 25 is open, air which is sucked in by the internal combustion engine flows from the surroundings via the air filter element 33 into a line section 34 and then further to the turbine 16, and from the latter via the feed line 24 into the intake manifold 6. Depending on the position of the second control valve 25, more or less air flows through the turbine 16, and a corresponding power transfer from the turbine 16 to the compressor 15 results. The air which flows in via the turbine 16 and thus its power transfer to the compressor 15 can be controlled via the second control valve 25. As FIG. 1 shows, there is provision according to a first exemplary embodiment both for an air filter element 31 to be assigned to the compressor 15 and for an air filter element 30 to be assigned to the turbine 16. The air filter elements 30 and 31 which are assigned separately in each case make it possible to dispense completely with corresponding feed lines to the clean air side downstream of the air filter 4. In addition to the compact design of the secondary air charger 14, this makes great variability possible, with the result that the secondary air charger 14 can be provided at different locations of the internal combustion engine 10.

Figure 2:
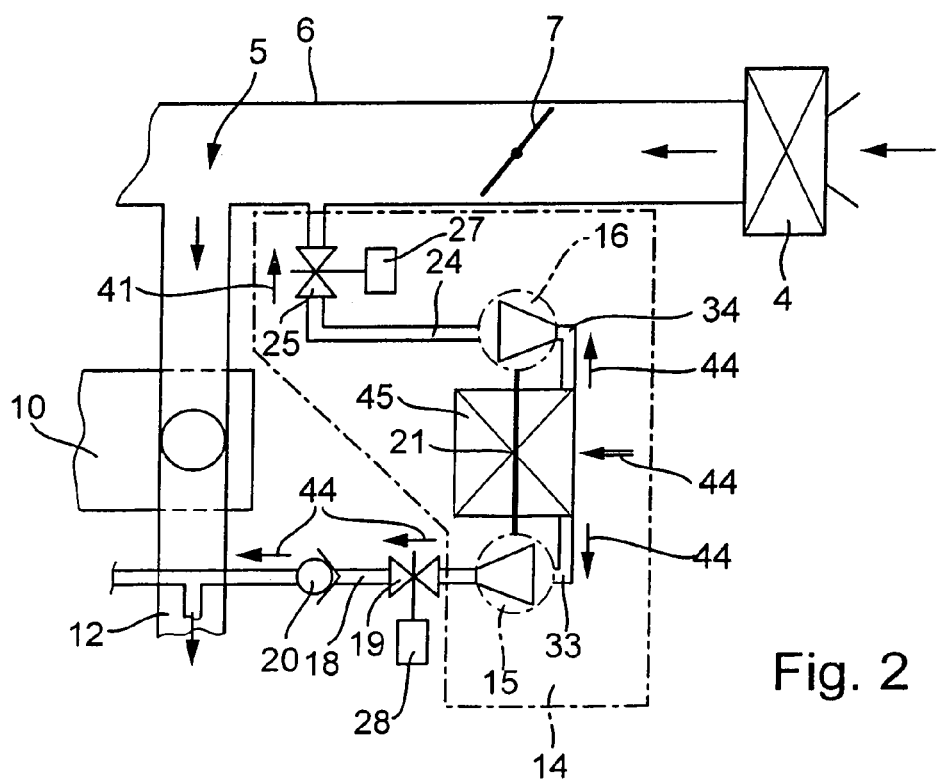
FIG. 2 shows in a simplified functional illustration the secondary air supply device according to a second embodiment of the invention.

FIG. 2 shows a second variant, in which all identical or identically functioning components are identified by the same designations. In a modification from the first variant as shown in FIG. 1, a common air filter element 45 is provided instead of the two separate air filter elements 30, 31, which common air filter element 45 is assigned both to the compressor 15 and to the turbine 16. The provision of a common air filter element 45 for the compressor 15 and the turbine 16 offers further advantages with regard to the design of the secondary air charger 14 in relation to its overall shape and the number of its components. As the arrows 44 show, the air which is required by the secondary air charger 14 flows in via the common air filter element 45 and is divided into a part flow to the compressor 15 and into a part flow to the turbine 16. The common air filter element 45 can have a different perforation or density distribution of its filter region which is adapted to the compressor 15 or the turbine 16, as the air mass flows which enter the compressor 15 and the turbine 16 can be different. In this way, an optimum adaptation or filter action with as low a pressure loss as possible can be achieved. It is also possible to provide a dividing wall in the interior of the common air filter element 45, with the result that there are two separate regions which have differently designed filter areas.

Figure 3:
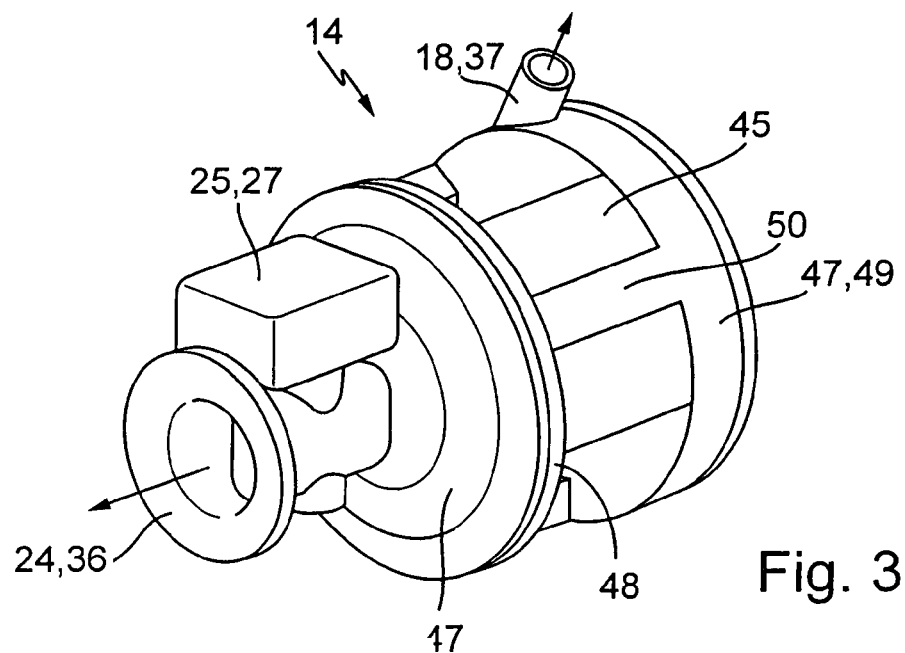
FIG. 3 is a perspective view of a secondary air charger with an integrated control valve.
Figure 4:
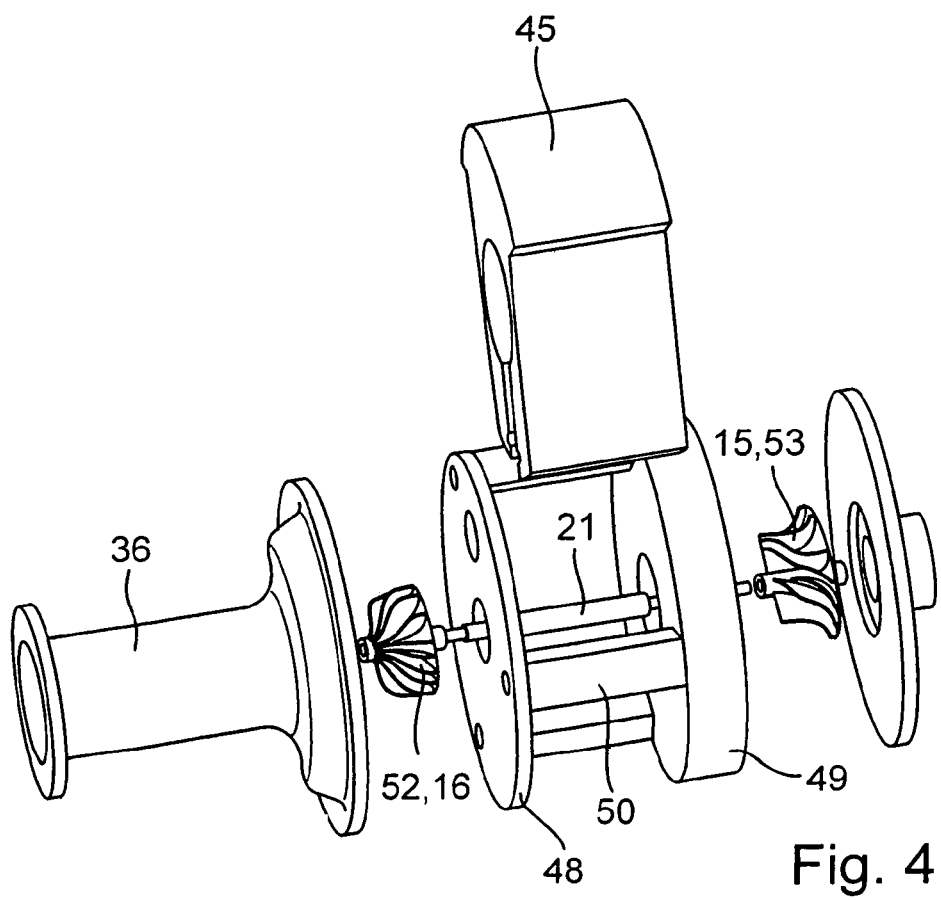
FIG. 4 is an exploded view of the secondary air charger without an integrated control valve.
Figure 5:
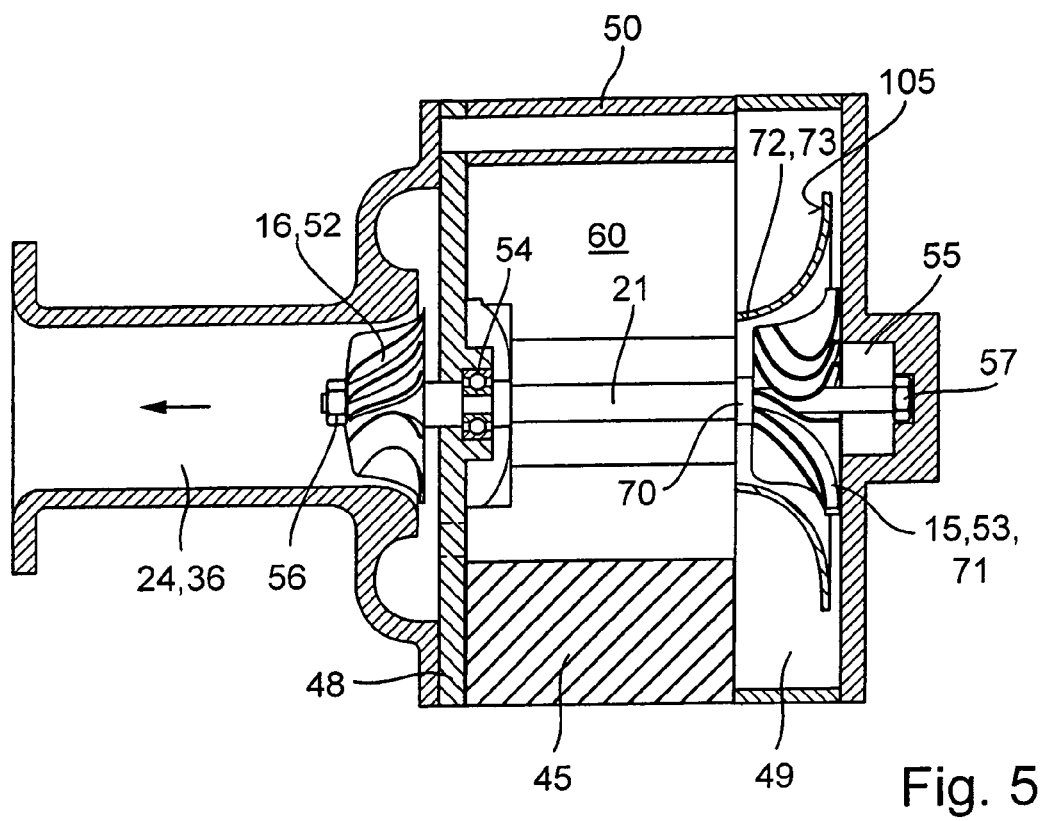
FIG. 5 is a cross-sectional illustration of the secondary air charger according to FIG. 4.

The structural design of the secondary air charger 14 for a common air filter element 45 of this type is shown in greater detail in the further FIGS. 3 to 5. FIG. 3 thus shows in a perspective illustration a secondary air charger 14, in which the second control valve 25, configured for example in the form of a rotary slide valve, is also additionally integrated into a housing 47 of the secondary air charger 14. The housing 47 of the secondary air charger 14 has a frame structure which is assembled essentially from two side elements, a first side element 48 and a second side element 49, and a plurality of axial struts 50. As FIG. 4 shows in greater detail, both side elements 48, 49 are penetrated by the shaft 21 of the secondary air charger 14, a turbine wheel 52 of the turbine 16 adjoining the side element 48 which is shown on the left and a compressor wheel 53 of the compressor 15 adjoining the side element 49 on the right. In the assembly according to FIG. 5, the turbine wheel 52 is situated outside an assembly space 60 which is delimited by both side elements 48, 49 and the compressor wheel 53 is situated inside said assembly space 60 which is delimited by both side elements 48, 49. The connection to the feed line 24 to the intake section 5 is effected via a funnel-shaped connection piece 36. As shown in FIG. 3, the second control valve 25 is accommodated, for example, in the connection piece 36, the actuator 27 lying outside the connection piece 36. However, it is also possible to configure the connection piece 36 without an integrated second control valve 25, as FIG. 5 shows, the second control valve 25 then being provided separately, that is to say outside the secondary air charger 14. The air which is compressed by the compressor wheel 53 is output into the secondary air line 18 via a connection 37 (shown in FIG. 3) on the second side element 49.

As FIG. 5 shows in greater detail, the shaft of the turbine wheel 52 is supported by a bearing 54 in the region of the side wall 48 which is shown on the left. In contrast, at the end of the compressor wheel 53, the shaft 21 is mounted by a bearing 55 substantially outside the side wall 49 which is shown on the right, for example by means of a ball bearing. This advantageously results in a relatively large bearing spacing for both ball bearings 54 and 55.

Like the turbine wheel 52, the compressor wheel 53 is screwed onto the shaft 21 via nuts 56, 57. It is also possible to provide a thread on the compressor wheel 53 or on the turbine wheel 52 and also on the shaft 21 so that the compressor and turbine wheels can simply be screwed onto the shaft 21. In comparison with the arrangement which is customary in the field of exhaust gas turbochargers (as can be gathered, for example, from DE 196 15 237 C2), the compressor wheel 53 is installed in a in reversed orientation rotated by 180°, such that the blading of the compressor wheel 53 points inward, that is to say toward the assembly space 60 between the side elements 48, 49. The blading of the turbine wheel 52 and the blading of the compressor wheel 53 are arranged such that the forces effective thereon point approximately in the opposite direction to one another. The spiral formation of the compressor wheel 53 is configured to run in the opposite direction to the spiral formation of the turbine wheel 52. The compressor wheel 53 is configured as a radial wheel or as a radial compressor. A configuration as an axial wheel or as an axial compressor is also possible, however. The turbine wheel 52 is configured as a radial wheel or as a radial turbine. A configuration as an axial wheel or as an axial turbine is also possible, however.

Figure 6:
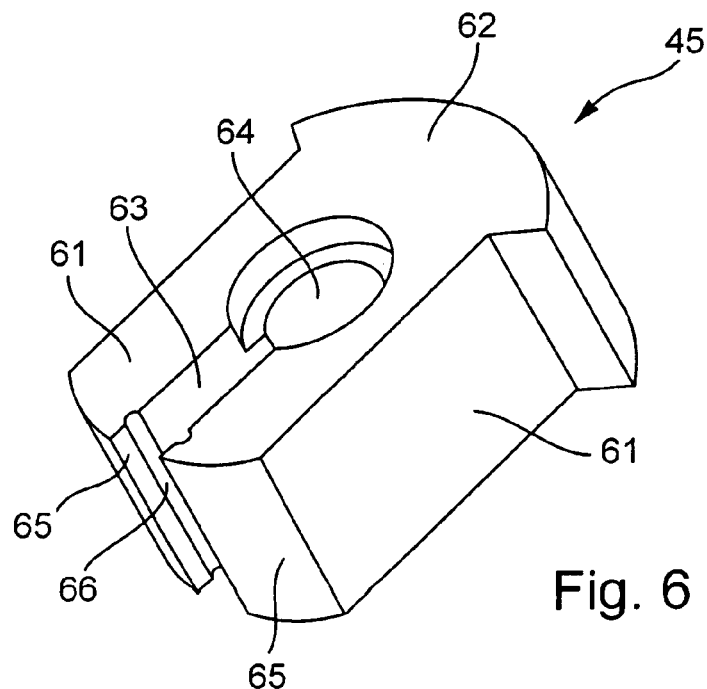
FIG. 6 shows in a perspective illustration an air filter element for the secondary air charger.

The assembly space 60 between the side elements 48, 49 serves to accommodate the air filter element 45. As FIG. 6 shows, the air filter element 45 has a horseshoe shape or U shape and comprises one piece including two side parts 61 and an arcuate connecting part 62. A slot 63 is formed between the side parts 61, which slot 63 merges into an opening 64 approximately in the center of the air filter element 45, this opening 64 being preferably round and having a greater diameter than the shaft 21. End sections 65 of the side parts 61 in each case have grooves 66 which are provided so as to lie opposite that side of the side parts 61 which faces the slot 63 and extend in the axial direction of the shaft 21. During the assembly of the air filter element 45, the latter is introduced into the assembly space 60 is guided by the side elements 48, 49 until latching lugs (not shown in greater detail) which are provided in the frame element or on the housing 47 in a corresponding manner to the grooves 66 engage in the grooves 66 in a latching manner. The designs of the slot 63 and of the cutout 64 are configured in such a way that a sufficient space is provided around the rotating shaft 21, which space precludes contact or damage of the shaft. As an alternative, it is also conceivable to secure the air filter element 45 on the housing 47 or on the frame via corresponding clips or screws. In the finally mounted state, the air filter element 45 fills the assembly space 60.

Figure 7:
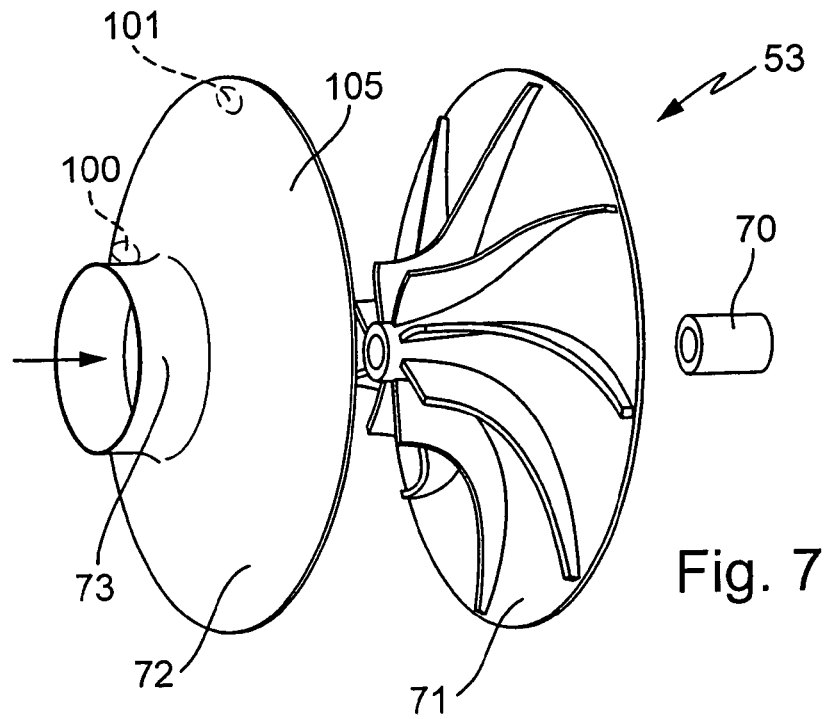
FIG. 7 shows in an exploded illustration a compressor wheel according to the invention of the secondary air charger.
Figures 8, 9:
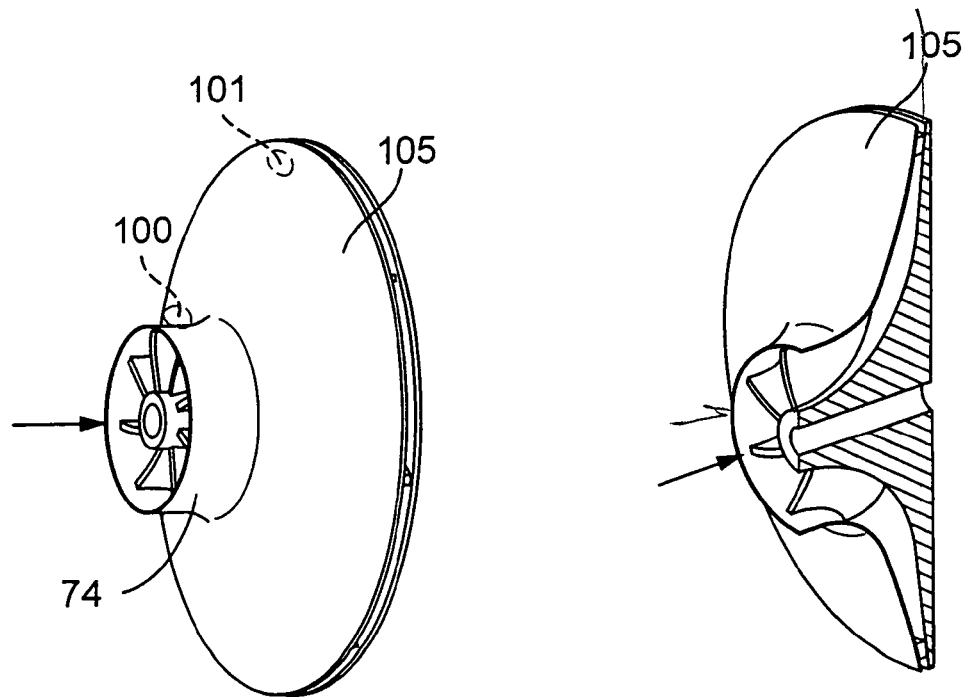
FIG. 8 shows in a perspective view the compressor wheel according to FIG. 7.
FIG. 9 shows in a partially sectional illustration the compressor wheel according to FIG. 8.
Figure 14:
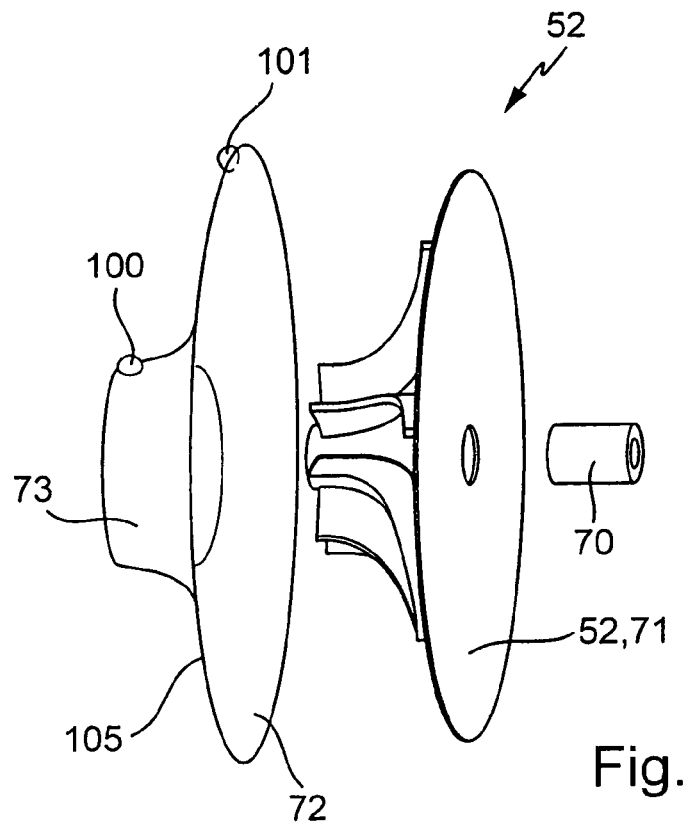
FIG. 14 shows in a perspective exploded illustration a turbine wheel according to a first exemplary embodiment according to the invention.
Figure 15:
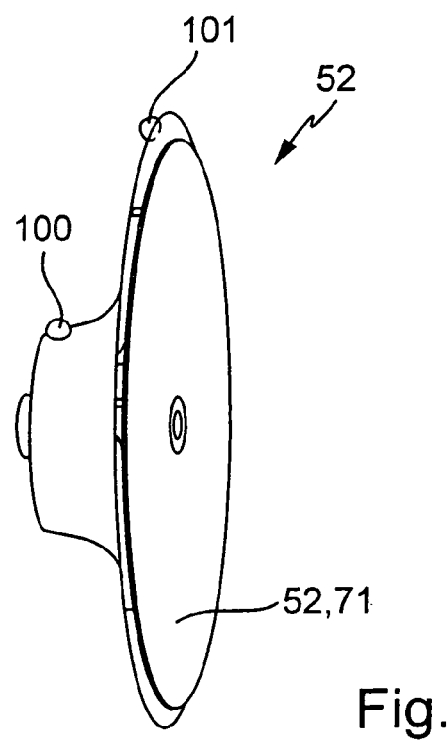
FIG. 15 shows a perspective illustration of the turbine wheel according to FIG. 14 in an assembled state.
Figure 16:
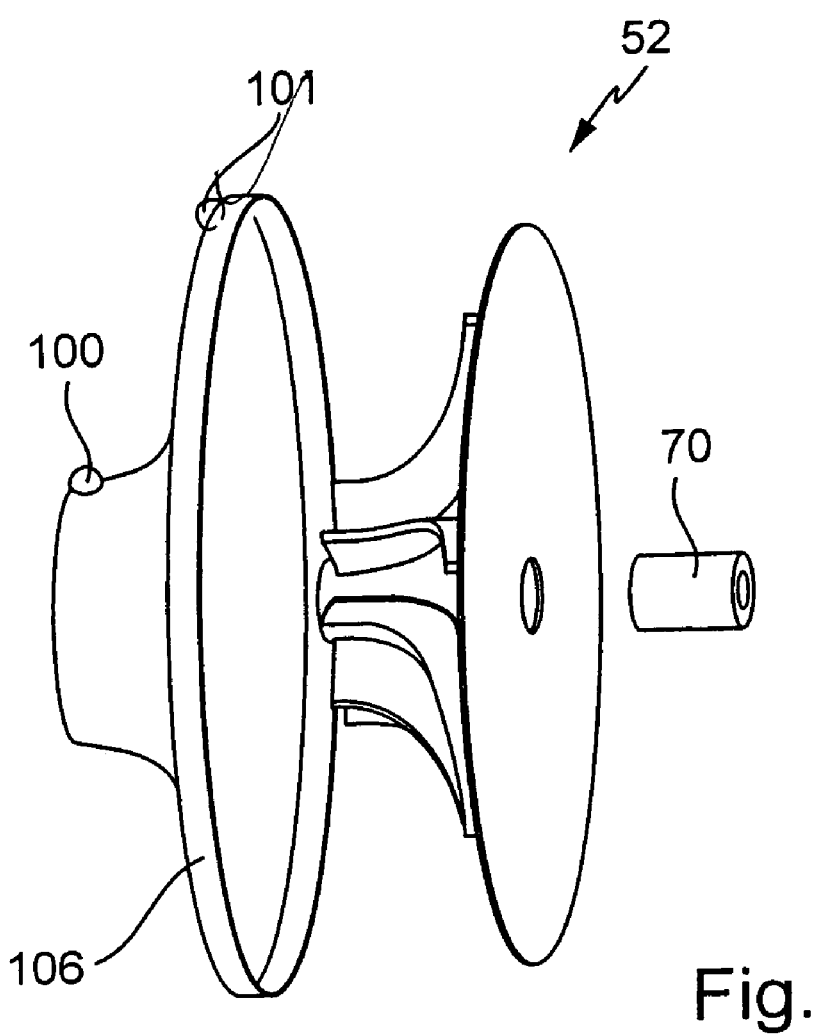
FIG. 16 shows in a perspective exploded illustration the turbine wheel according to the invention according to a second exemplary embodiment according to the invention.

FIGS. 7 to 9 show the construction according to the invention of the compressor wheel 53 in greater detail. The designs can also be used for the turbine wheel 52. The turbine wheel 52 corresponds to the compressor wheel 53 apart from the changed shape of the blades. The invention is therefore not restricted to the compressor wheel 53 but rather also includes the turbine wheel 52 in an identical manner. One exemplary embodiment of the turbine wheel 52 is given in greater detail in FIG. 14 showing an exploded illustration of the turbine wheel. FIG. 15 shows the wheel of FIG. 14 in an assembled state. FIG. 16 shows a second exemplary embodiment of the turbine wheel 52. The compressor wheel 53 (or turbine wheel 52) can have a metallic bush 70 in the shaft region, the metallic bush 70 being embedded in an impeller wheel 71 which is preferably injection-molded from plastic. The impeller wheel 71 is covered by a wheel cover 72 which preferably comprises a thin metal sheet or else is manufactured from plastic. The wheel cover 72 has a domeshaped region 73 for the air to flow in. The wheel cover 72 is displaced or set back axially with respect to the impeller wheel 71, with the result that the overlapping part 74 of the wheel cover 72 forms a first seal 100, for example in the form of a labyrinth seal, in combination with an annular groove (not shown) which is provided in the housing 47 of the secondary air charger 14. The seal 100 makes it possible to seal off the compressor wheel 53 (or the turbine wheel 52) in the housing 47, with the result that all the air can flow into the interior of the impeller wheel 71 without losses at the dome 73 (in the case of the turbine, an outflow takes place in a corresponding manner out of the interior of the impeller wheel 71). In an identical manner, the air which flows radially out of the compressor wheel 53 at its radial end region 105 (in the case of the turbine, the exhaust gas which flows in radially in a corresponding manner) can be sealed off, for example in the form of a labyrinth seal, via a second seal 101, for example in conjunction with an annular groove (not shown in greater detail) in the housing 47. The first seal 100 is provided in the dome region 73 and the second seal 101 is provided in the radially outer region 105 of the wheel cover 72 toward the housing and can comprise a labyrinth seal or else a brush seal. If a brush seal is used, it should have only low friction, with the result that there is a low breakaway torque during running of the wheel 53 or 52. As FIG. 16 shows in greater detail, it is also possible to provide an axially overlapping edge 106 on the wheel cover 72, with the result that the second seal 101, for example in the form of a brush seal, can act radially on the edge 106 instead of axially on the side surfaces.

The components including the bush 73, the impeller wheel 71 and the wheel cover 72 are joined together to form one unit. Suitable joining methods are, for example, adhesive bonding, injection molding or ultrasound welding. The compressor wheel 53 (or the turbine wheel 52) is composed at least partially of plastic, preferably of polyamide and/or PEEK (polyetheretherketone, a derivative of polyethersulfones) and/or PFA (perfluoro alkoxyl alkane). The plastic of the compressor wheel 53 (or of the turbine wheel 52) can be configured with or without fiber reinforcements. However, it is also possible to configure the compressor wheel 53 (or the turbine wheel 52) from a light metal alloy, in particular on the basis of aluminum or magnesium.

Figure 10:
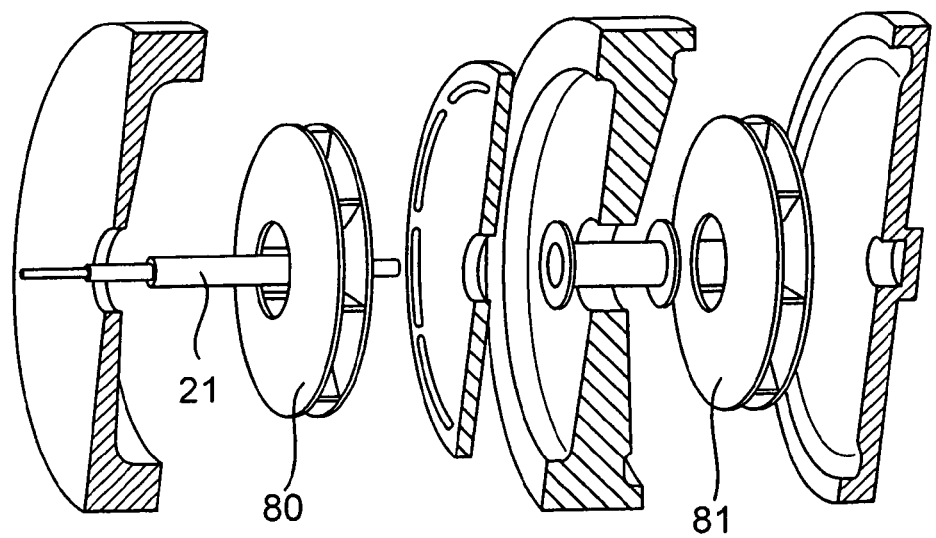
FIG. 10 shows in an exploded illustration compressor wheels according to a third embodiment of the invention.
Figure 11:
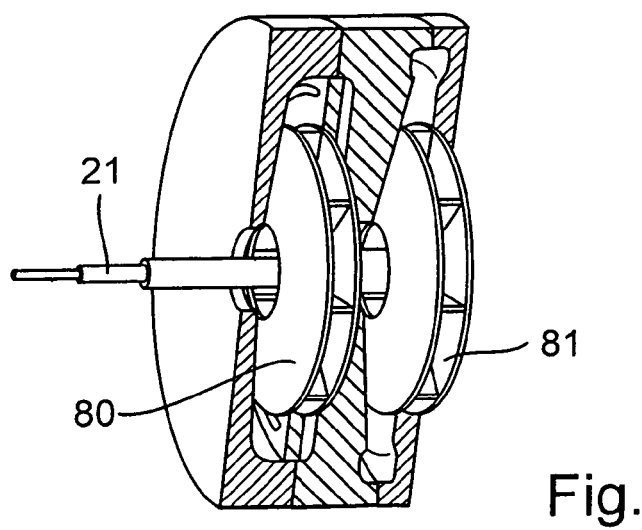
FIG. 11 shows in a perspective illustration the compressor wheels according to FIG. 10.

This wheel variant has the advantage that critical tolerances can occur only in the region of the edges of the wheel cover 72. Furthermore, the sealing with respect to the housing 47 takes place substantially in the region of the air inlet or air outlet. The gap size between the housing 47 and the wheel cover 72 is not critical, as sealing effect can be attained in the region of the air inlet and also in the region of the air outlet as a result of the annular groove which is configured as a labyrinth seal. Furthermore, the effects of typical tolerances which necessarily occur in wheels which are manufactured from plastics can be kept small as a result of this construction. As an alternative to the embodiment of the compressor wheel 53 according to FIGS. 7 to 9, it is also possible, as FIGS. 10 and 11 show in greater detail, to provide multiple stage compression, in particular in two stages. To this end, two compressor wheels 80, 81 which are connected in series and are configured in the form of radial wheels are shown by way of example according to FIGS. 10 and 11. Both radial wheels are arranged on the same shaft 21.

Figure 12:
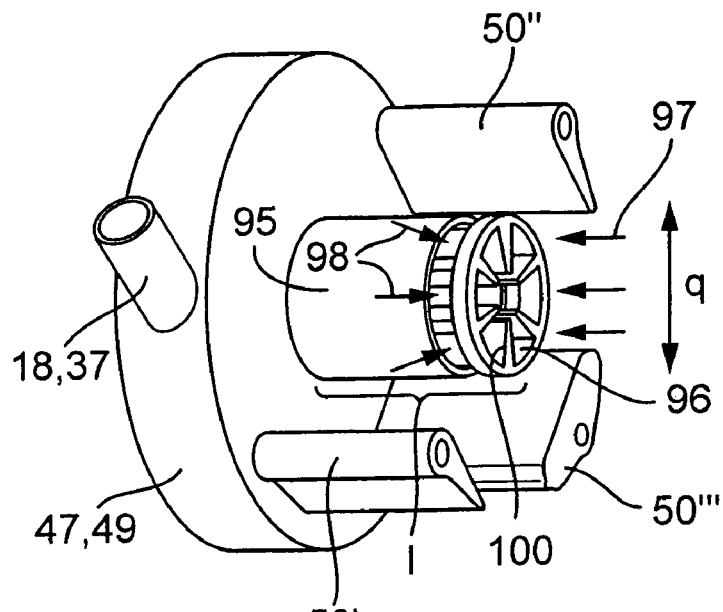
FIG. 12 shows a side element of the secondary air charger of a fourth embodiment.

FIG. 12 shows a fourth variant of a side element 49 of the secondary air charger 14, in which all identical or identically functioning components have been identified with the same designations of the preceding exemplary embodiments. The right side element 48 has three side struts 50, two side struts 50' and 50" which lie opposite one another serving for the introduction of the air filter element 45. The third side strut 50''' which extends transversely with respect to the two other side struts 50', 50" serves for the latchable fastening of the air filter element 45, which has two latching lugs 90 for this purpose. The latching lugs 90 can latch into latching grooves 66 provided in the air filter as shown in FIG. 6. The compressor wheel 53 is surrounded by a cylindrical or tubular element 95 which forms an inflow channel for the compressor wheel 53. In order to attain an optimum action of the compressor 15, the prepared air should flow into the compressor 15 in the axial direction in as laminar a manner as possible through the air filter 45 which is disposed ahead of the compressor. A ratio of the inflow channel length 1 to the inflow channel cross section q should be 3:1 or greater, preferably 5:1. This stipulation is not met in the exemplary embodiment according to FIGS. 4 and 5. Here, the inflow channel is formed from parts of the air filter cassette 45 and the struts 50 which form the center part of the housing. If the width of the center part 50 of the housing or the axial extent of the assembly space 60 and thus the length of the inflow channel are increased, a more favorable ratio results. However, this also leads to an undesirable increase in the overall length of the secondary air charger 14.

The tubular element 95 forms the inflow channel for the compressor 15 or compressor wheel 53 and is an integral constituent part of the right side element 49. In the installed state of the side element 49, the tubular element 95 surrounds the shaft 21, preferably up to a point close to the turbine wheel 52. The shaft 21 is thus protected against damage during assembly of the air filter element 45. At least one aperture 96 is provided on the end of that side of the tubular element 95 which faces away from the compressor wheel 53. A plurality of apertures 96 are preferably provided which are cut out in a star-shaped, radially outwardly extending manner on a circumferential surface of the element 95 and are delimited between radial struts 100, with the result that there are a plurality of circular segments which are separated from one another by the radial struts 100, as viewed axially. The individual segments or lamellae or ribs lead to an improvement in the ratio of the inflow channel length to the inflow channel cross section. In addition to the axial inflow into the inflow channel (arrows 97), the apertures 96 also make a radial inflow (arrows 98) into the inflow channel possible. As a result of the apertures 96, it is possible to obtain a region of laminar air flow.

Figure 13:
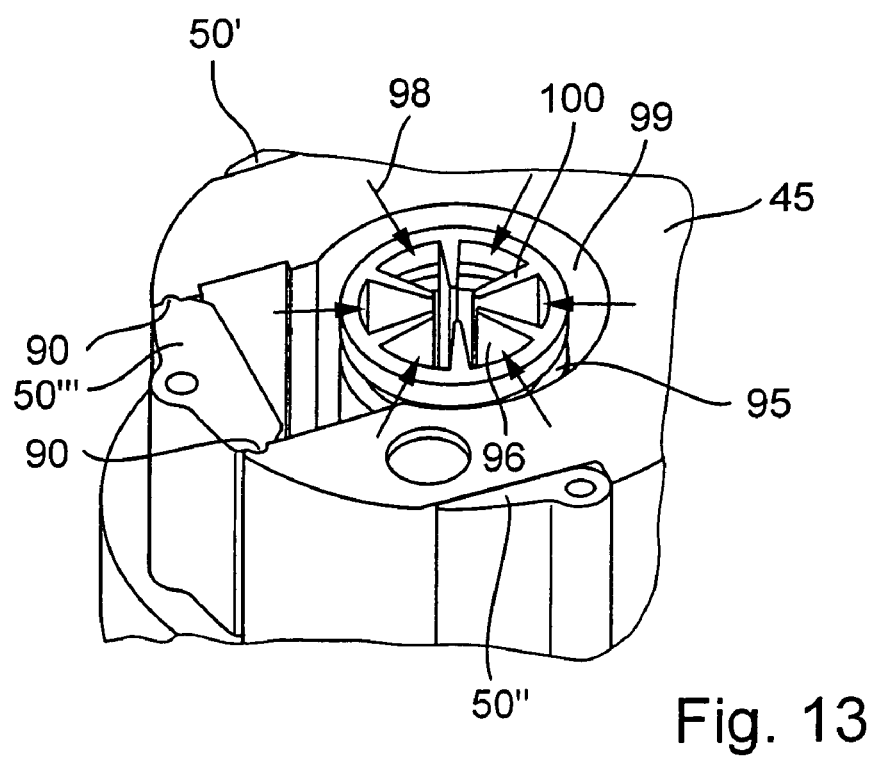
FIG. 13 shows in a perspective plan view the side element according to FIG. 12 with an installed air filter element.

As FIG. 13 shows in a perspective plan view of the side element 49 with an installed air filter element 45, it is advantageous to configure the air filter element 45 in such a way that a pre-chamber 99 for the air is provided between the inflow channel 95 and apertures 96, as a result of the radial spacing from the inner surface of the filter element 95.

What is claimed is:

1. A secondary air supply device (14) comprising a secondary air charger (14) with a compressor (15) including a compressor wheel (53) and with a turbine (16) including a turbine rotor (52), the turbine (16) being driven via the vacuum which prevails in an intake section (5) of an internal combustion engine and the compressor (15) having a compressor wheel (53) which supplies secondary air into an exhaust gas region (12) of the internal combustion engine, the air which is required by the compressor (15) and by the turbine (16) being supplied via a common air filter (45), the secondary air charger (14) having a compressor housing (47) with a frame structure (48, 49, 50) forming a space (60) with the common air filter element (45) disposed in the space (60), said compressor housing (47) having a tubular element (95) formed integrally therewith so as to axially project from the housing (47) into the space (60) and forming an inflow channel with axial and radial apertures (96) at its free end for conducting air in a laminar flow from the space (60) to the compressor (15) or compressor wheel (53), the common filter element (45) surrounding the tubular element (95) in spaced relationship so as to form an annular air pre-chamber (99).

2. A secondary air supply device according to claim 1, wherein the turbine rotor (52) and the compressor wheel (53) have spiral blades and the blades of the compressor wheel (53) and those of the turbine rotor (52) are configured in opposite directions.

3. A secondary air supply device according to claim 1, wherein at least one of the compressor wheel (53) and the turbine wheel (52) is composed at least partially of a light metal alloy.

4. A secondary air supply device according to claim 1, wherein the air filter element (45) is of U-shaped configuration.

5. A secondary air supply device according to claim 4, wherein the air filter element (45) is accommodated in the space 60 in a latched manner.

6. A secondary air supply device according to claim 5, wherein a groove (66) is provided on side parts (61) of the air filter element (45) which are disposed opposite one another, and a latching lug is provided in a corresponding manner on the housing (47) for engagement in the groove (66).

7. A secondary air supply device according to claim 6, wherein grooves (66) are provided on both side parts (61) of the air filter element (45), the grooves being disposed opposite one another, and two latching lugs (90) are provided in a corresponding manner on a side strut (50''') of a side element (49) of the housing (47) of the secondary air charger (14).

8. A secondary air supply device according to claim 1, wherein at least one of the compressor wheel (53) and the turbine wheel (52) consists at least partially of a plastic material, comprising at least one of polyamide, PEEK and PEA.

9. A secondary air supply device according to claim 8, wherein the plastic material is fiber reinforced.

10. A secondary air supply device according to claim 1, wherein the compressor wheel is a multistage wheel.

11. A secondary air supply device according to claim 10, wherein a plurality of compressor wheels are arranged in series so as to form a multi-stage compressor wheel.

* * * * *